United States Patent [19]

Bresowar

[11] Patent Number: 4,812,295
[45] Date of Patent: Mar. 14, 1989

[54] APPARATUS FOR DRY SCRUBBING A HOT GAS AND START-UP PROCESS

[75] Inventor: Gerald E. Bresowar, Homewood, Ala.

[73] Assignee: Combustion Engineering, Inc., Windsor, Conn.

[21] Appl. No.: 103,336

[22] Filed: Oct. 1, 1987

[51] Int. Cl.[4] .................. C01B 17/56; B01D 50/00
[52] U.S. Cl. ................... 422/169; 422/160; 422/161; 422/170; 423/242; 55/99; 55/354; 210/297; 210/400
[58] Field of Search ............... 422/169, 170, 171, 160, 422/161; 423/242 A, 244 A; 55/259, 479, 354, 99; 159/409; 210/297, 400

[56] References Cited

U.S. PATENT DOCUMENTS

| 2,867,324 | 1/1959 | Hirs | 55/354 X |
|---|---|---|---|
| 2,881,861 | 4/1959 | Dyer | 55/354 |
| 2,969,148 | 1/1957 | Hirs | 55/354 X |
| 3,261,149 | 7/1966 | Althuser | 55/354 |
| 3,783,588 | 1/1974 | Hudis | 55/354 X |
| 4,351,849 | 9/1982 | Meade | 426/285 X |
| 4,504,451 | 3/1985 | Quee et al. | 423/242 A |

Primary Examiner—Barry S. Richman
Assistant Examiner—Amalia L. Santiago
Attorney, Agent, or Firm—William W. Habelt

[57] ABSTRACT

Hot flue gas, such as the flue gas from a fossil fuel furnace or a waste incinerator, to be scrubbed to remove acidic gas, such as sulfur dioxide and hydrogen chloride gas, and particulates, such as fly ash, is passed to a primary drying chamber and contacted therein with a spray of droplets of an absorbent liquid containing particles of an alkali or alkaline reactant. The droplets are partially dried in the primary drying chamber to a tacky condition before reaching a foraminous collecting member extending through a lower portion of the primary drying chamber wherein it collects as a moist, porous mat. As the flue gas continues to flow through the mat depositing on the collecting member, the mat serves as a filter for removing particulates, including fly ash, in the gas and the remaining sulfur oxides in the gas react with unreacted particles of reactant and reactive ingredients of the fly ash collected in the mat. The flue gas leaving the primary drying chamber is passed to a secondary drying chamber wherein it is again passed through the mat which is translated across the secondary drying chamber from the primary drying chamber. As the gas passes through the mat in the secondary chamber, water is evaporated from the mat to dry the particulate material forming the mat thereby facilitating its subsequent removal. During start-up and initial operation, a gas permeable supplemental filter means is selectively positioned across the secondary drying chamber and subsequently withdrawn therefrom in synchronization with the movement of the mat into the secondary drying chamber.

1 Claim, 3 Drawing Sheets

APPARATUS FOR DRY SCRUBBING A HOT GAS AND START-UP PROCESS

BACKGROUND OF THE INVENTION

The present invention relates to an apparatus for removing acidic gases, such as sulfur dioxide and hydrogen chloride gases, from a hot gas, such as the flue gas produced during the combustion of a sulfur bearing fossil fuel or refuse. More particularly, it relates to a spray drying apparatus and process for scrubbing hot gases wherein the gas to be scrubbed is first contacted with a spray of absorbent liquid and then passes through a foraminous collecting member upon which is deposited particulate material originally entrained in the gas, as well as particulat salts formed by reaction of the absorbent with the acidic gases.

Sulfur oxides are produced during the combustion of sulfur bearing fossil fuels, such as oil and coal. Other acidic gases, such as hydrogen chloride, are produced in addition to sulfur oxides during the combustion of refuse such as household garbage and industrial waste. The adverse effect on the environment of discharging such acidic gases into the atmosphere is well established and has led to legislation greatly restricting the amount of sulfur oxide and other gaseous pollutants which may be emitted to the atmosphere.

One particular spray dryer apparatus and process well suited for use in scrubbing acidic gas from a hot flue gas is disclosed in U.S. Pat. No. 4,504,451. As disclosed therein, the hot flue gas to be scrubbed is passed to a primary drying chamber and contacted therein with a spray of droplets of an absorbent liquid containing particles of an alkali or alkaline reactant. The droplets are partially dried in the primary drying chamber to a tacky condition before reaching a foraminous collecting member extending through a lower portion of the primary drying chamber whereon it collects as a moist, porous mat. As the flue gas continues to flow through the mat depositing on the collecting member, the mat serves as a filter for removing particulates, including fly ash, in the gas and the remaining sulfur oxides in the gas react with unreacted particles of reactant and reactive ingredients of the fly ash collected in the mat. The flue gas leaving the primary drying chamber is passed to a secondary drying chamber wherein it is again passed through the mat which is translated across the secondary drying chamber from the primary drying chamber. As the gas passes through the mat in the secondary chamber, water is evaporated from the mat to dry the particulate material forming the mat thereby facilitating its subsequent removal.

In the operation of such a scrubbing apparatus, the flue gas leaving the secondary drying chamber is typically clean enough during normal steady state operation to be vented directly to the atmosphere. However, during initial start-up when the foraminous member is clean having no particulate material build-up, and in the latter stages of start-up before sufficient particulate has been deposited on the foraminous collecting member to form an effective tacky mat for removing particulate material from the hot gas, the gas leaving the secondary drying chamber may not be clean enough to vent directly to the atmosphere depending upon existing particulate emission regulations. Therefore, it has been customary to make provision for back-up particulate collection by passing the gas leaving the secondary drying chamber through an additional downstream particulate collector, such as a cyclone, a fabric filter or an electrostatic precipitator, prior to venting the flue gas to the atmosphere. Unfortunately, the provision of an additional downstream particulate collector, which is generally not necessary at steady-state operation, results in an undesirable increase in overall system pressure drop experienced by the gas in traversing the system thereby adversely increasing fan power consumption.

Accordingly, it is an object of the present invention to provide a scrubbing apparatus of the mat type wherein a supplementary particulate filter means is provided during start-up operation but removed from the gas flow path during steady-state operation.

SUMMARY OF THE INVENTION

The present invention provides an improved process and an improved spray drying apparatus for scrubbing acidic gases, such a sulfur dioxide and hydrogen chloride gas, from a hot gas containing such acidic gases, such as a flue gas from the combustion of fossil fuel or refuse.

The basic process to which the invention relates includes the steps of introducing the hot gas containing the acidic gases into the primary drying zone of a spray dryer having a primary drying zone and a secondary drying zone, providing a foraminous collecting member extending through a lower portion of the primary drying zone and the secondary drying zone, contacting the hot gas with droplets of an absorbent comprising a liquid and solid particles of an alkaki or alkaline reactant for reacting with the acidic gases for sufficient time to partially evaporate liquid from the particle-containing droplets so as to partially dry the particle-containing droplets to the point where the surfaces of the particles are in a tack condition, passing gas from the primary drying zone through the foraminous collecting member extending therethrough to the secondary drying zone, whereby the tacky particles are deposited on the collecting member and become bonded together to form a mat having a sufficient porosity to permit the continuous flow of gas therethrough, moving the mat from the primary zone into the secondary zone by translating the foraminous collecting member, passing the gas introduced into the secondary drying zone through the mat in the secondary drying zone to the gas outlet of the spray dryer, whereby remaining acidic gases in the gas may react with unreacted reactant particles in the mat and further liquid may be evaporated from the mat to produce a dried mat containing reactant product particles of the acidic gases and the absorbent, removing the dried mat from the collecting member prior to returning the collecting member to the primary drying zone, and venting the scrubbed gas to the atmosphere.

In accordance with the present invention a gas permeable filter means is selectively positioned prior to start-up to extend across a region of the secondary drying zone between the gas inlet thereto and the gas outlet therefrom. Once the mat is built-up on the endless belt in the primary drying zone, the belt is activated and the mat is slowly translated into the secondary drying zone. As the mat enters the secondary drying zone, the withdrawal of the gas permeable filter means from the secondary drying zone is initiated. The withdrawal of the gas permeable filter means is coordinated with the movement of the mat into the secondary drying zone whereby at least a substantial portion of the gas passing through the secondary drying zone traverses at least one of either the mat or the gas permeable filter means thereby removing from the gas a substantial portion of the particulate material entrained therein.

Further, a spray dryer apparatus is provided for carrying out the improved process of the present invention, the apparatus comprising a housing enclosing a primary drying chamber and a secondary drying chamber laterally adjacent to primary drying chamber and substantially separated therefrom by a division wall mounted within the housing, first duct means interconnecting the primary drying chamber and the secondary drying chamber for providing a gas flow passage therebetween, draft means connected in flow communication with the primary and secondary drying chambers for causing a flow of gas through the primary drying chamber and thence through the secondary drying chamber and thence out of the housing of the spray dryer, at least one spray means opening into the primary drying chamber for introducting a spray of an absorbent comprising solid particles of an alkali or alkaline reactant in a liquid into the drying chamber to contact the hot gas passing therethrough to react with the acidic gases in the hot gas, an endless collecting belt supported for horizontal movement sequentially through the primary drying chamber between the gas inlet thereto and the gas outlet therefrom and thence through the secondary drying chamber between the gas inlet thereto and the gas outlet thereof, drive means for advancing the endless collecting belt, and gas permeable filter means selectively positionable across a region between the second gas inlet to the secondary drying chamber and the second gas outlet from the secondary drying chamber whereby at least a substantial portion of the flue gas passing through said chamber passes through said gas permeable filter means.

BRIEF DESCRIPTION OF EMBODIMENT

Figure 1:
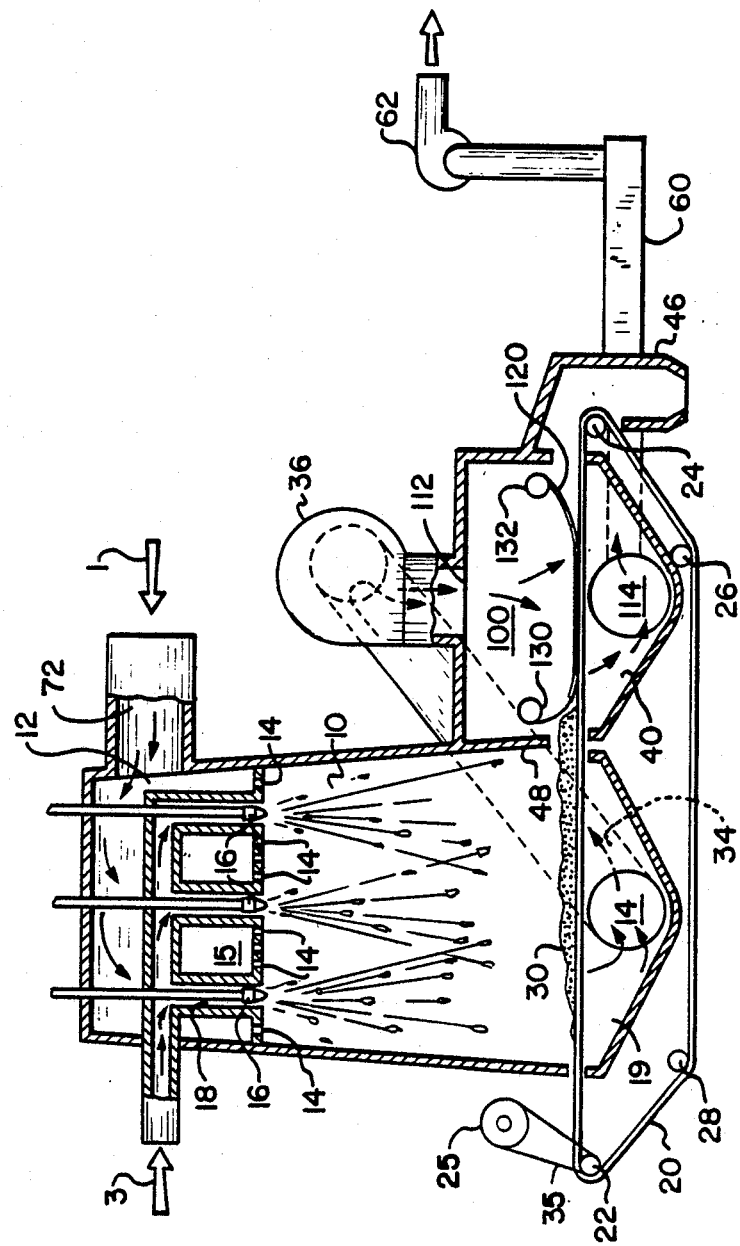
FIG. 1 illustrates, in diagrammatic form, a spray dryer apparatus for dry scrubbing a flue gas in accordance with the process of the present invention.

The process of the present invention, and the spray drying apparatus for carrying out the process of the present invention, are adaptable for use in dry scrubbing acidic gases and particulate materials from a wide variety of hot gases containing same. They are particularly adaptable for use in dry scrubbing acidic gases, such as sulfur oxides and hydrogen chloride gas, and fly ash from flue gases generated from the burning of sulfur-containing fossil fuels, such as coal and lignite, as well as the flue gases generated from incinerating household refuse or industrial waste. Accordingly, the process and apparatus of the present invention will be described hereinafter in connection with such use.

The process and apparatus of the present invention are an improvement on the basic process for dry scrubbing sulfur oxides and particulate contaminous from a hot flue gas disclosed in U.S. Pat. No. 4,504,451, which is incorporated herein by reference, and the spray dryer apparatus described therein for carrying out the process.

Referring now to the drawing, there is illustrated a spray drying system suitable for carrying out the process of the present invention. The system includes a generally vertical primary drying chamber (10) and a secondary drying chamber (100) enclosed in a single housing (2) in laterally adjacent relationship with a partition wall (48) substantially separating one chamber from the other. A first gas inlet duct (12) is provided in the upper region of the primary drying chamber (10) for receiving the hot flue gas containing acidic gases, such as sulfur oxides or hydrogen halide gases, into the upper portion of the primary drying chamber (10). Typically, hot flue gas leaving the air preheater of a fossil fuel furnace or a waste incineration furnace would have a temperature in the range of 100 to 200c.

The upper portion of the primary drying chamber (10) serves as a spray zone. At least one spray nozzle or atomization means (16) is provided in the spray zone of the primary drying chamber (10) to open thereto for introducing a spray of absorbent into the hot flue gas passing through the primary drying chamber (10) from the first gas inlet (12) in the upper region thereof to the first gas outlet (14) in a lower region of the primary drying chamber (10). The spray means (16) are connected to a source of absorbent which comprises a solution, slurry or disperison of an alkali or alkaline reactant in a liquid such as water. The absorbent is atomized in the spray means (16) to form minute droplets which contain particles of the alkali or alkaline reactant. Generally, an atomizing gas (3), such as compressed air, is passed about the spray means (16) to assist in the atomization of the absorbent fluid and to improve the dispersion of the droplets into the hot flue gas (1) passing through the primary drying chamber (10). Suitable reactants include, but are not limited to, sodium carbonate, sodium bicarbonate, sodium hydroxide, sodium sesquicarbonate, calcium oxide (lime), calcium hydroxide (slaked lime), calcium carbonate (limestone), dolimite, magnesium hydroxide, and mixtures thereof.

The reactant particle containing liquid droplets introduced into the primary drying chamber (10) through spray means (16) are entrained in the hot flue gas introduced into the upper region of the primary drying chamber (10) through a first gas inlet (12) and flowing downwardly pass the spray nozzle means (16) towards the first gas outlet (14) in the lower region of the primary drying chamber (10). As the hot gases flow downwardly through the primary drying chamber (10) the sulfur oxides in the gas began to react with the reactant particles entrained in the liquid droplets and are converted to acid salts of the absorbent compounds. Additionally, as the reactant liquid droplets fall downwardly through the spray drying chamber (10) in contact with the hot flue gas, they are partially dried to a tacky condition by the hot flue gas.

An endless collecting belt (20) is supported for horizontal movement sequentially through the lower region of the primary drying chamber (10) into and through a lower region of the secondary drying chamber (100) through a gap (50) formed in the partition wall (48) which substantially separates the primary drying chamber (10) from the secondary drying chamber (100). The endless collecting belt (20) comprises a foraminous collecting member of the mesh type, preferably such as a woven fabric belt as disclosed in U.S. Pat. No. 4,116,756, which is incorporated therein by reference.

The endless collecting belt (20) is disposed in a lower region of the primary drying chamber (10) between the first gas inlet (12) thereto and the first gas outlet (14) therefrom thereby effectively separating the spray zone portion of the primary drying chamber (10) from the suction chamber (19) thereof which is formed in the lowermost region of the primary drying chamber (10) beneath the endless collecting belt (20) and about the first gas outlet (14) therefrom. The endless collecting belt (20) extends from the primary drying chamber (10) through the gap (50) formed in the partition wall (48) into and through the secondary drying chamber (100) between the second gas inlet (112) in the upper region of the secondary drying chamber (100) and the second gas outlet (114) in a lower region of the secondary drying chamber (100). Again the endless collecting belt (20) effectively separates the secondary drying chamber (100) into a gas receiving plenum above the endless collecting belt (20) and a suction chamber (40) below the endless belt (20) in a lower most region of the secondary drying chamber (100) about the second gas outlet (112) therefrom. Therefore, the flue gas passing through the primary dryng chamber (10) and the secondary drying chamber (100) must traverse the endless belt (20) in both drying chambers.

While other constructions may be used, the collecting member preferably is in form of a belt (20) trained around rollers (22, 24, 26 and 28) for horizontal movement through the lower portion of the primary drying chamber (10) and the secondary drying chamber (100) as hereinbefore described. The belt (20) is driven clockwise as viewed in the drawing at a relatively slow speed, typically 1 to 5 inches per minute, by suitable means such as a motor (25) connected in driving relationship to the roller (24) by a belt drive (35) or the like. The belt (20) is preferably a foraminous collecting member made from a double-layered fabric woven from a monofilament synthetic material consisting of two layers of weft yarn interconnected by a plurality of warp threads as described in U.S. Pat. No. 4,116,756.

In steady-state operation of the apparatus, the reactant particle containing liquid droplets are partially dried to a tacky condition by the flue gas as they pass downwardly through the drying chamber (10) and are deposited upon the collecting member (20) as the flue gas passes therethrough to enter the suction chamber (19) therebelow and pass out the first gas outlet (14) into and through the connecting gas duct (34) to the second gas inlet (112) opening to the secondary drying chamber (100). As the process is designed such that the surfaces of the partially dried droplets are still in a tacky condition when they reach the collecting member (20), the droplets and the particulate material therein collect on the collecting member (20) and bind together at the points of contact between particles to form a mat having sufficient porosity to permit a flue gas to flow therethrough. The ability of the particles to form such a bond without coalescing into a substantially impermeable mass depends primarily upon the temperature and moisture content of the particles at the time they strike the collecting member (20) and/or the particles in the already accumulating mat (30) on the collecting member (20). The interrelationships of these variables for spray dryers employing a porous collecting member is described in more detail in U.S. Pat. Nos. 3,520,066, 3,615,723, 3,741,273 and 4,351,849, all of which are incorporated herein by reference.

The residence time of the mat (30) in the primary spray drying zone (10) is controlled by varying the speed at which the collecting member (20) travels through the primary drying zone (10). The thickness of the mat increases with increasing residence time and can be up to several inches. The reactant particles in the mat should remain moist as long as possible to maximize the reaction with the acidic gases in the flue gas. Typically, the moisture content of the mat in the primary drying zone should be in the neighborhood of about 12% to 25%.

In addition to providing a bed of reactant particles for converting acidic gases in the flue gas to acid salts, the mat also serves as a filter for removing entrained particulate contaminates, such as fly ash, from the flue gas. The particulate contaminates are physically separated from the flue gas and become part of the mat building up on the collecting member (20) as the flue gas passes through the mat (30). This filtration of entrained particulate matter, both particulate matter originally in a flue gas and the reactant particles formed by reaction of the absorbent with the acidic gas, reduces the required capacity of auxiliary filters for the flue gas exiting from the spray dryer (2).

Flue gas passing through the mat (30) in the primary drying chamber (10) enters the suction chamber (19) below the belt (20) in the lower most portion of the primary drying chamber (10) and exhausts therefrom through the first gas outlet (14) into the cross over duct (34). The flue gas flows through the cross over duct (34) to and through the second gas inlet (112) into the secondary drying chamber (100). A suction blower or fan (36) is connected in the duct (34) to induce the flow of the flue gas through the mat (30) building in the primary drying chamber and provides sufficient pressure boost so that the flue gas can again pass through the mat (30) as it traverses the secondary drying chamber (100). As the belt (20) traverses from the primary drying chamber (10) through the secondary drying chamber (100), the mat (30) of unreacted absorbent particles, acidic salts and other particulate matter, such as fly ash, collected on the belt (20) in the primary drying chamber (10), is traversed by the flue gas introduced into the secondary drying chamber through the second gas inlet (112). As the flue gas again passes through the mat (30), further reaction of acidic gases therein occurs with the unreacted absorbent and any reactive ingredients in the fly ash in the mat. The flue gas passing through the mat (30) in the secondary drying chamber (100) flows into an exhaust chamber (40) portion of the secondary drying chamber (100) beneath the belt (20) and passes therefrom through the second gas outlet (114) to exit from the spray dryer apparatus into the flue gas outlet duct (60). Typically, the flue gas flowing through the gas outlet duct (60) directly to the atmosphere. Although generally not necessary, the flue gas may be passed through a secondary particulate collector, (not shown), such as a cyclone or a bag filter, disposed in the flue gas duct (60) for removing any residual entrained particulate matter before the flue gas is exhausted to the atmosphere by the fan (62).

In the secondary drying chamber (100), additional liquid is evaporated from the mat (30) as the hot gas flows therethrough to dehydrate the particles forming the mat (30) to a dried state permitting the mat (30) to be conveniently removed from the collecting member (20). From the secondary drying chamber (100), the mat (30) passes into the hopper (46) wherein the mat (30) is broken into small chunks which fall through the hopper (46) to be collected for disposal. A portion of these chunks (44) of dried mat material may be comminuted into powder form for recycling in order to utilize any unreactant absorbent contained thereon. The comminuted recycle power is typically mixed with fresh powdered reactant material and dispersed in carrier liquid to form the absorbent which is introduced into the upper portion of the primary drying chamber (10) through spray means (16). The comminuted recycle powder may also be mixed with liquid by itself without fresh reactant to form absorbent solution.

Unfortunately, during start-up or initial operation of the absorber/collector, the mat (30) is not built-up on the belt (20). Rather, it has been found that the belt (20) must be clean without any bed build-up from previous operation. Because of pozzolonic reactions that occur in the mat (30) over several hours, mat build-up from previous operation is generally not suitable for use as an adhesive media for particulate collection during start-up, even after a short outage of only one hour. Consequently, until the mat being formed in the primary chamber (10) can move on the belt (20) into the secondary chamber (100) so as to completely span the secondary chamber (100) and begin discharging into collection trough (46), the mat (30) is largely ineffective during start-up for collecting particulate in the secondary chamber. Absent the provision of additional downstream particulate removal equipment and the cost thereof, this can be a problem in so much as a visible plume will be emitted from the stack for, potentially, up to four hours during start-up.

Figure 2:
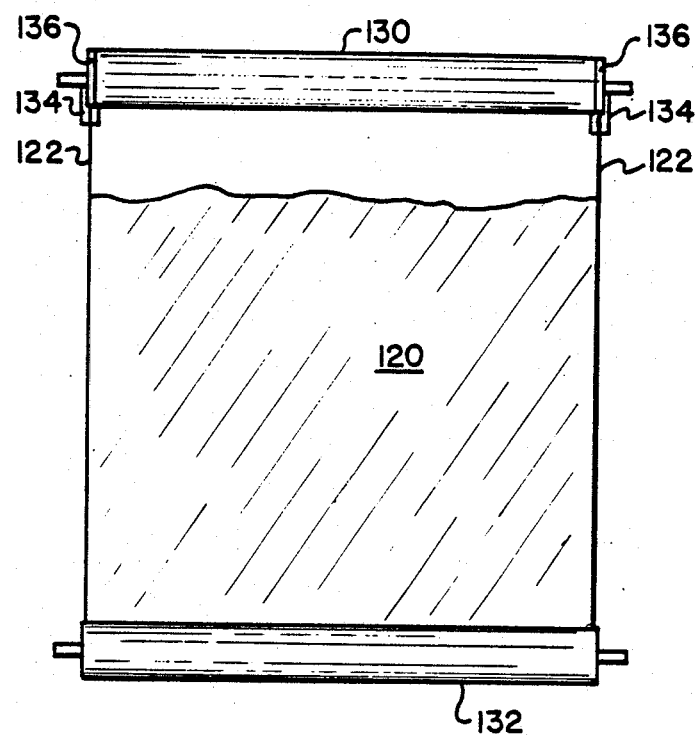
FIG. 2 is enlarged elevational view showing the disposition of the supplemental filter means in the secondary drying chamber of the spray dryer apparatus of FIG. 1.
Figure 3:
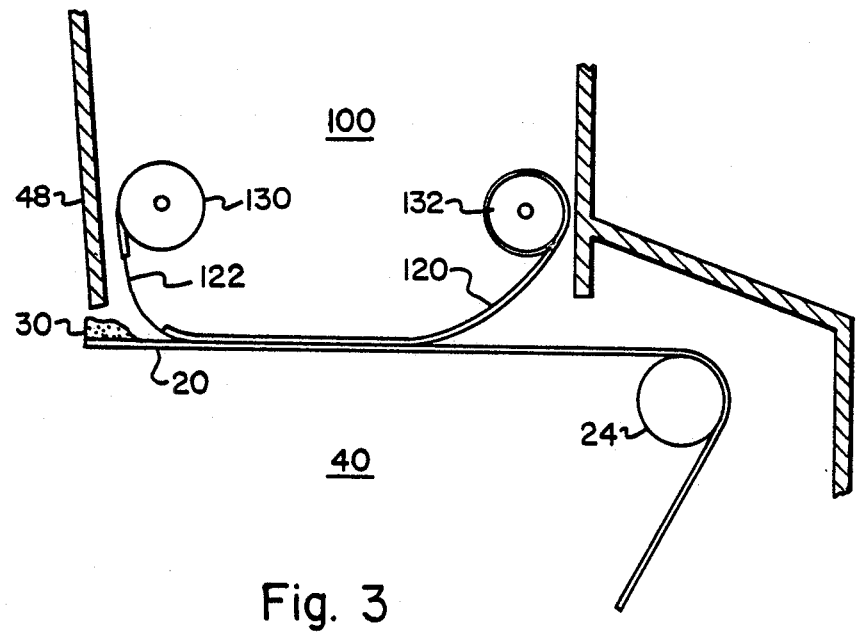
FIG. 3 is plan view taken along line 3—3 of FIG. 2.

In accordance with the present invention an "artificial" bed is effectively provided in the secondary chamber (100) by selectively positioning gas permeable filter means (11) therein as best seen in FIGS. 2 and 3 to filter the flue gas passing therethrough until the mat (30) has built-up sufficiently on belt (20) to be effective as a particulate filter. The gas permeable filter means (110) serves to remove particulate material carried over from the primary drying chamber in the flue gas entering the secondary drying chanber so that the flue gas vented to the atmosphere through duct (60) will result in a low-opacity, clear plume during start-up of the spray dryer scrubber.

In the preferred embodiment of the present invention shown in the drawing, the supplemental filter means (110) comprises an elongated gas permeable fabric sheet (120) which is disposed between rolls (130, 132) so as to be selectively positionable across the secondary drying chamber (100) above the belt (20). The fabric is stretched to span between two parallel support members (122), such as wires or ropes. The wires or ropes are positioned above the belt (20) in the secondary chamber (100), and the fabric is seam lapped around the wire/rope along each edge. The wire/rope runs from a feeder roll to a take up roll. The feeder roll may be provided with a guide (134), and groove (136) at either end to prevent the wire/rope from moving out-of-position.

Preferably, the gas permeable fabric is a sheet of tightly woven or felted cloth. The cloth should desirably have a clean draft loss of 1.0 to 2.0 inches water column at a face velocity of 150 feet/minute (i.e., actual cubic feet per minute per square foot of cloth area).

During normal, continuous operation, the wire/rope (122) extends suspended above the belt (20) from the feeder roll (130) to the take-up roll (132), while the cloth (120) and the wire/rope (122) which is lapped by the cloth is wound up completely on the take-up roll (132). Of course, the rolls (130, 132) are stationary, that is, not turning during normal continuous operation when the mat (30) is fully developed. The cloth is rolled between feeder and take-up rolls only during start-up.

Prior to start-up, the plant operator initiates an action which rotates the take-up roll (132) and feeder roll (132) in a cooperative manner so as to selectively position the cloth (120) over the belt (20) in the secondary chamber (100). In the process of starting the boiler or other flue gas generator, the forced draft and induced draft fans associated therewith (not shown), as well as the booster fan (62) are started. As the fire is initialized in the gas generator, the flue gas temperature begins to rise and feed of the scrubbing solution or slurry is initiated to the spray nozzles (16) in an amount sufficient to maintain a desired gas temperature at the inlet to the booster fan (62). As the mat (30) begins to build up in the primary chamber (10), the total pressure drop in the gas from the inlet duct (72) to the primary chamber outlet plenum (19) increases. At a preselected pressure drop, drive of the belt (20) is automatically initiated and the belt (20) begins to move slowly out of the primary chamber (10) into the secondary chamber (100) thereby beginning the movement of the mat (30) which has built-up on the portion of the belt (20) formerly positioned in the primary drying chamber (10) into the secondary drying chamber (100).

As the mat (30) moves into the secondary drying chamber (100), the take-up of the supplemental fabric filter means is initiated by activating the feeder roll (130) and/or the take-up roll (132) to begin rewinding the cloth (120) about the take-up roll (132). Advantageously, the rotation of the rolls (130, 132) is controlled such that the movement of the cloth (120) across the secondary drying chamber (100) onto the take-up roll (132) is synchronized with the movement of the built-up mat (30) into the secondary drying chamber (100) such that as the cloth (120) is taken-up, it is replaced as a filter means by the mat (30) moving into the secondary drying chamber.

In this manner, the cloth (120), which is selectively pre-positioned across the secondary chamber (100) prior to start-up, serves to filter out at least a substantial portion of the particulate matter carried over in the flue gas from the primary drying chamber (10) during the initial stages of start-up. Then, as the built-up mat (30) moves into the secondary drying chamber (100) on belt (20) and wind-up of the cloth (120) is begun, the cloth (120) serves in conjunction with the mat (30) to ensure that nearly all of the flue gas passing through the secondary drying chamber (100) traverses either that portion of the cloth (120) still exposed in the secondary drying chamber (100) or the mat (30) entering the secondary drying chamber (100). Once the mat (30) is fully within the secondary drying chamber (100), the cloth (120) is fully withdrawn and normal filtering via the mat (30) commences.

I claim:

1. A spray dryer apparatus for scrubbing acidic gas from a hot gas comprising:
   a. a housing enclosing a primary drying chamber and a secondary drying chamber laterally adjacent the primary drying chamber and substantially separated therefrom by a division wall mounted within said housing, said housing having a first gas inlet opening into an upper portion of the primary drying chamber for receiving a flow of hot gas containing an acidic gas to be removed therefrom, a first gas outlet opening from a lower portion of the primary drying chamber, a second gas inlet opening into an upper portion of the secondary drying chamber, and a second gas outlet opening from a lower portion of the secondary chamber;
b. first duct means interconnected between the first gas outlet of the primary drying chamber and the second gas inlet of the secondary drying chamber for providing a gas flow passageway therebetween;
c. draft producing means connected in flow communication with the primary and secondary drying chambers for causing the flow of gas from the first gas inlet through the primary drying chamber, thence through the first gas outlet, thence through the first duct means, thence through the second gas inlet, thence through the secondary drying chamber, and thence out of said housing through the second gas outlet;
d. at least one spray means opening into the primary drying chamber for introducing a spray of a liquid and solid particles of an alkali or alkaline reactant into the primary drying chamber to contact the hot gas passing therethrough to react with the acidic gas in the hot gas;
e. an endless collecting belt supported for horizontal movement sequentially through the primary drying chamber located between the first gas inlet and the first gas outlet thereof and thence through the secondary drying chamber between the second gas inlet and the second gas outlet thereof;
f. drive means for advancing the endless collecting belt; and
g. supplemental filter means operatively associated with the secondary drying chamber for filtering particulate material from the flue gas passing therethrough, said supplemental filter means comprising gas permeable filter means selectively positionable across a region of the secondary drying chamber between the second gas inlet to the secondary drying chamber and the second gas outlet form the secondary drying chamber and upstream with respect to flue gas flow of said endless collecting belt whereby at least a substantial portion of the flue gas passing through the secondary drying chamber passes through said gas permeable filter means prior to passing through said endless collecting belt; said gas permeable filter means comprising an elongated gas permeable fabric sheet, a first roll, a second roll, drive means for rotating at least one of said first and second rolls in synchronization with collecting belt drive means so as to withdraw the gas permeable fabric sheet from said region of said secondary drying chamber in synchronization with the endless collecting belt passing through the secondary drying chamber, and means for operatively connecting said gas permeable fabric sheet between said first and second rolls whereby upon rotation of said rolls said gas permeable fabric sheet is unwound from one of said rolls and taken-up onto the other of said rolls, said first and second rolls disposed within the secondary drying chamber across the second gas inlet to the secondary drying chamber.

* * * * *